United States Patent
Terajima et al.

[11] Patent Number: 5,987,220
[45] Date of Patent: *Nov. 16, 1999

[54] PHOTOGRAPHIC PRINTER AND CONDITION-SETTING METHOD FOR PHOTOGRAPHIC PRINTER THEREOF

[75] Inventors: Akirou Terajima, Kanagawa; Mamoru Ogasawara, Saitama, both of Japan

[73] Assignees: Fuji Photo Film Co., Ltd., Kanagawa; Fuji Photo Optical Co., Ltd., Saitama, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,168

[22] Filed: Jul. 3, 1996

[30] Foreign Application Priority Data

Jul. 6, 1995 [JP] Japan .................................. 7-170814
Jun. 5, 1996 [JP] Japan .................................. 8-143241

[51] Int. Cl.$^6$ ............................. G06K 15/12; H04N 1/23
[52] U.S. Cl. ..................... 395/109; 358/504; 358/406; 358/302; 358/527
[58] Field of Search ................. 358/527, 501, 358/302, 406, 504; 355/35, 55, 61, 69, 72, 54; 347/226, 246

[56] References Cited

U.S. PATENT DOCUMENTS

| | | |
|---|---|---|
| 4,764,807 | 8/1988 | Kimura et al. .................... 358/527 |
| 4,809,198 | 2/1989 | Terashita .......................... 355/35 |
| 4,839,674 | 6/1989 | Hanagata et al. ................ 346/136 |
| 5,036,402 | 7/1991 | Shiota .............................. 358/527 |
| 5,040,018 | 8/1991 | Kawada et al. . |
| 5,081,529 | 1/1992 | Collette ........................... 358/504 |
| 5,084,727 | 1/1992 | Maronian et al. ................ 355/69 |
| 5,165,074 | 11/1992 | Melino ............................ 358/481 |
| 5,422,741 | 6/1995 | Fracas et al. .................... 358/527 |

*Primary Examiner*—Scott Rogers
*Attorney, Agent, or Firm*—Sughrue, Mion, Zinn, Macpeak & Seas,PLLC

[57] ABSTRACT

A photographic printer and a method for setting conditions therefor with a reduced burden are disclosed. A test pattern image data is stored in memory in advance. At the time of setting conditions, the test pattern image data is read from the image memory and displayed on a liquid crystal panel, and a print is produced on the basis of the test pattern data displayed. The density of an image in this print corresponding to an image of the Bull's eye negative film is measured. The resulting density value is compared with a reference density value to set proper exposure conditions. Also, the displacement of the crossing point from a reference position is measured thereby to set the conditions for correcting the transport performance. In this way, the condition-setting work is realized without using any negative film having a test pattern recorded thereon.

24 Claims, 3 Drawing Sheets

PHOTOGRAPHIC PRINTER AND CONDITION-SETTING METHOD FOR PHOTOGRAPHIC PRINTER THEREOF

BACKGROUND OF THE INVENTION

1. Field of the Invention

The present invention relates to a photographic printer and a method for setting conditions for the photographic printer, or more particularly, to a photographic printer and a condition-setting method for the photographic printer, in which an image recorded in a photographic film is exposed on a light-sensitive material by plane exposure while an image data prestored in memory is displayed on a two-dimensional display unit and exposed on the light-sensitive material.

2. Description of the Prior Art

In the prior art, a negative film having various test patterns recorded thereon is used in order to set various conditions for the photographic printer as described below. As an example, what is called a Bull's eye negative film primarily intended for a gray circular image is exposed and processed to produce a print, the density of which is measured and compared with a predetermined reference density, thereby setting a proper exposure condition. Also, what is called a chart negative film primarily associated with a cross pattern is exposed and processed thereby to produce a print. The displacement of this print from a predetermined reference position is measured using a predetermined jig or the like so that proper paper transport conditions are set.

A negative film with test patterns recorded on it, however, is liable to be deformed or the reference point thereof often damaged or otherwise adversely affected in transit, and therefore it is necessary to handle it carefully. Also, a negative film may be discolored due to secular variations, thereby making it necessary to strictly conform to the effective period of use for each negative film. In this way, the work for setting conditions using a negative film as described above is quite troublesome.

In this connection, a photographic printer has been proposed, which comprises a main exposure section for exposing an image recorded on a negative film and a subsidiary exposure section for performing exposure and processing to produce a print on the basis of an image displayed on a two-dimensional display unit such as a liquid crystal panel. An example of an application of the subsidiary exposure section is an index printer for producing an index print composed of the frames of a developed negative film arranged in matrix and compressed. With this index printer, the image data of each frame of the negative film read by a predetermined scanner is stored in a predetermined memory. The image data of several frames are read out of the memory and displayed on a two-dimensional display unit at a predetermined timing. The several frames of images thus displayed are exposed on paper, thereby producing an index print.

Conditions must also be set for this index printer, but no method for setting such conditions has yet been established. Conventionally, therefore, the operator loads a negative film with test patterns recorded thereon (for example, a Bull's eye) in a negative carrier of the exposure section (main exposure section) for an official print, so that a test pattern image is read by scanner and the image data of the test pattern is temporarily stored in memory. Further, a test pattern is displayed on a two-dimensional display unit based on the image data stored in memory, a print is produced based on the test pattern thus displayed, and conditions are set using the print thus produced. The condition-setting work for this index printer is very troublesome and inconvenient.

SUMMARY OF THE INVENTION

The present invention has been developed in view of the above-mentioned facts, and the object thereof is to provide a photographic printer and a condition-setting method for the photographic printer which is capable of reducing the labor of the condition-setting work.

According to a first aspect of the invention, there is provided a photographic printer having a plane exposure section for exposing an image recorded on a photographic film by plane exposure on a light-sensitive material, and a digital print section for displaying an image prestored in a memory on a two-dimensional display unit and for exposing the image on the light-sensitive material, the photographic printer comprising:

test pattern data acquisition means for acquiring condition-setting test pattern data;

display control means for displaying the condition-setting test pattern on the two-dimensional display unit; and operating conditions setting means for setting the operating conditions on the basis of the print image of the test pattern acquired by being displayed on the two-dimensional display unit and exposed.

According to the first aspect of the invention, condition-setting pattern data are acquired by the test pattern data acquisition means at the time of setting conditions. A test pattern includes, for example, an image on a Bull's eye, an image on a control negative film and an image on a chart negative film (such as a cross pattern and a resolving power chart).

The condition-setting test pattern acquired is displayed on the two-dimensional display unit by the display control means, and the image displayed on the two-dimensional display unit is exposed on the light-sensitive material at the digital print section. The operating condition-setting means then sets the operating conditions on the basis of the print image of the test pattern acquired by exposure.

In the case where the cross pattern is used as a test pattern, for example, a print image of a cross pattern is obtained in a manner similar to the above-mentioned method, and the displacement of the intersection of the cross pattern is measured from a predetermined reference point on this print image, thereby setting the transport conditions for the light-sensitive material.

As described above, conditions can be set for other than the plane exposure section using a print image of a test pattern acquired by exposure. By the operating conditions of a printer other than the plane exposure section as referred to here is meant at least a set of conditions including the transport conditions for the light-sensitive material, the exposure conditions for the digital print section and the device operating conditions for the digital print section. The device operating conditions for the digital print section include the setting of conditions specific to a two-dimensional display unit, such as the setting of conditions for correction by a two-dimensional display unit with respect to light-source irregularities.

According to the first aspect of the invention, conditions can be set for other than the plane exposure section without using any photographic film. The troublesome work which otherwise might be required in using a photographic film can thus be eliminated thereby to reduce the inconvenience of the condition-setting work.

Also, a plurality of test patterns are stored in memory in advance, and a desired condition-setting test pattern data can be acquired at the time of setting conditions, which test pattern data can be displayed on the two-dimensional display unit. Therefore, the jobs of loading a negative film, reading an image by scanner and writing the read image into memory which have conventionally been required for displaying test pattern on a two-dimensional display unit for a digital print section (such as an index print section) are eliminated, so that the labor of the condition-setting work can be reduced for the digital print section.

The above-mentioned two-dimensional display unit may be, for example, a liquid crystal display panel (LCD, hereinafter referred to as the liquid crystal panel). In the case where a liquid crystal panel is used as a two-dimensional display unit, condition-setting test pattern data are acquired by a test pattern data acquisition means and the condition-setting test pattern acquired is displayed on a liquid crystal panel by means of the liquid crystal display control means at the time of setting conditions. The condition-setting means can set the operating conditions on the basis of the print image of the test pattern acquired by being displayed on the liquid crystal panel and exposed. A device such as a DMD (digital micromirror display) or an ECD (electrochemical display) other than the liquid crystal display panel may be used as a two-dimensional display unit.

According to a second aspect of the invention, there is provided a condition-setting method for a photographic printer in which an image recorded on a photographic film is exposed by plane exposure on a light-sensitive material, and image data prestored in a memory are displayed on a two-dimensional display unit and exposed on the light-sensitive material, the method comprising the steps of:

acquiring condition-setting test pattern data;

displaying the condition-setting test pattern on the two-dimensional display unit; and setting the operating conditions on the basis of a print image of the test pattern acquired by being displayed on the two-dimensional display unit and exposed.

According to the second aspect, a condition-setting test pattern is acquired and displayed on the two-dimensional display unit. The image of the condition-setting test pattern displayed is exposed, and the operating conditions are set on the basis of the print image of the test pattern thus acquired by exposure.

In this way, as in the first aspect, conditions for other than the plane exposure section can be set without using a photographic film. Therefore, the troublesome jobs required with a photographic film are eliminated and the load of the condition-setting work can be reduced.

DETAILED DESCRIPTION OF THE PREFERRED EMBODIMENTS

An embodiment of the invention will be explained below with reference to the case in which a liquid crystal panel is used as a two-dimensional display unit as shown in the accompanying drawings.

Figure 1:
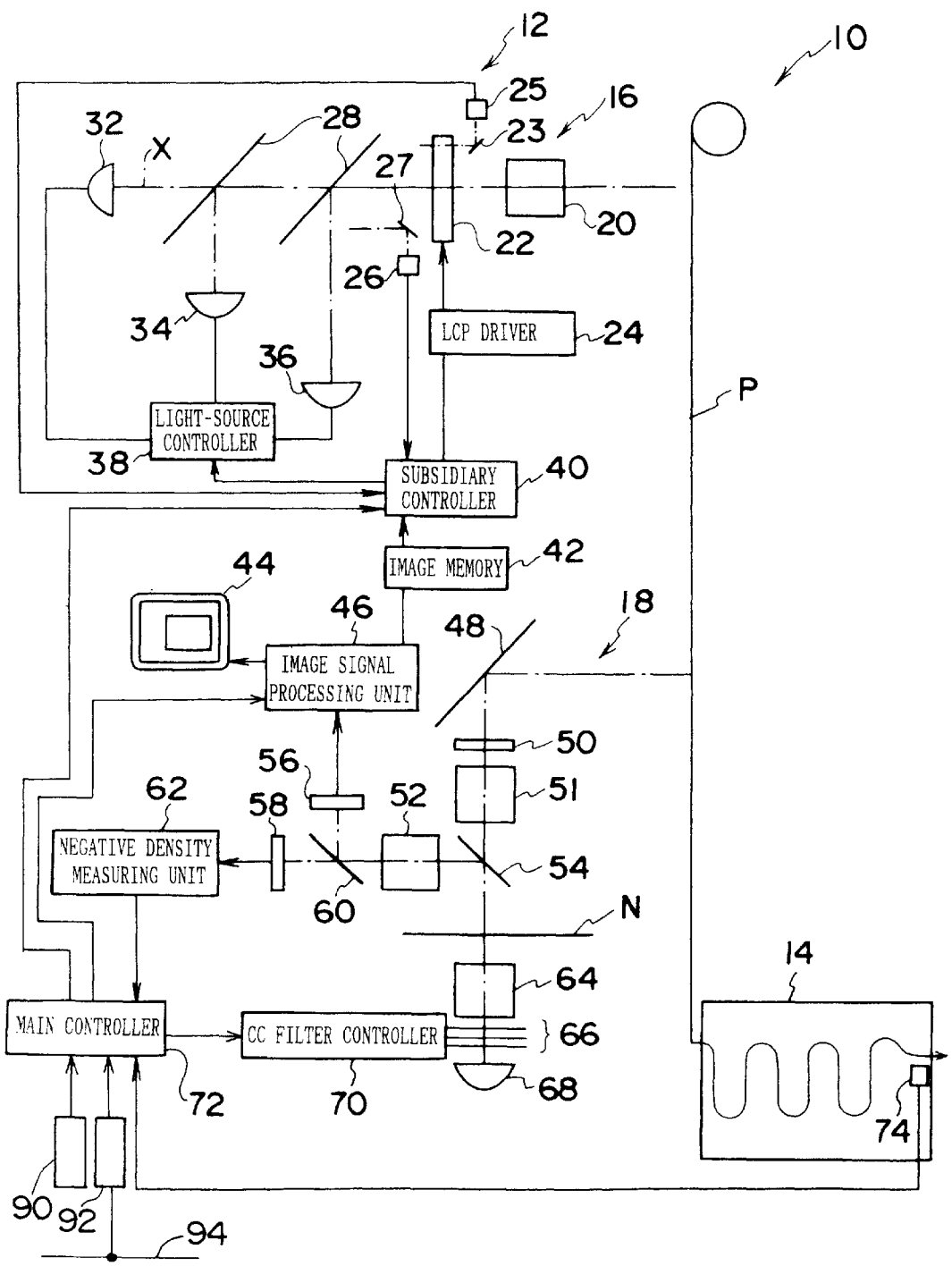
FIG. 1 is a block diagram schematically showing a printer processor according to an embodiment.

A configuration of a printer processor 10 is schematically shown in FIG. 1. A printer section 12 of the printer processor 10 includes two exposure sections, i.e., a main exposure section 18 for exposing each frame of an image on color paper P and a subsidiary exposure section 16 for exposing a matrix arrangement of frames of images on color paper P for producing an index photo.

The main exposure section 18 includes a light source 68 composed of a halogen lamp or the like for emitting an exposure light, a color-correction filter set (hereinafter referred to as the CC filter) 66 made up of three filters of C (cyan), M (magenta) and Y (yellow) arranged in an exposure light path. The CC filter set 66 is connected to a CC filter controller 70 for inserting each filter of the CC filter set 66 into and retracting it from the exposure light path.

A diffusion box 64 is arranged downstream of the CC filter 66 and in an exposing position for exposing an image of a negative film N downstream of the diffusion box 64 in the exposure light path. A half mirror 54 is arranged downstream of the exposing position.

An exposure lens 51 for modifying the magnification of the exposed image and a black shutter 50 for shutting off the exposure light are arranged sequentially in the downstream of the light path passing through the half mirror 54. A mirror 48 for reflecting the exposure light in a substantially perpendicular direction is arranged downstream of the black shutter 50. The exposure light reflected from the mirror 48 is irradiated on the color paper P, so that the color paper P is exposed.

On the other hand, a photometry lens 52 for modifying the magnification of a photometric image is arranged in the downstream of the light path reflected from the half mirror 54, and a half mirror 60 downstream of the photometry lens 52. A scanner 56 including an image sensor or the like is disposed in the direction of light reflection from the half mirror 60. The scanner 56 is connected to an image signal processing unit 46 for performing a predetermined image processing on the image data of the negative film read by the scanner 56.

The image signal processing unit 46 is connected with a simulator 44 as an image display unit. The simulator 44 is adapted to display a simulation image of a print which is prepared in accordance with the conditions set for each frame of image of the negative film N.

The image signal processing unit 46, which is also connected to an image memory 42 for storing image data, causes the image data of each frame of the negative film N read by the scanner 56 to be stored in the image memory 42. Further, the image memory 42 has prestored therein image data of various test patterns used for maintenance of the printer processor 10. As an example of a test pattern, the image memory 42 has prestored therein an image data corresponding to a n image of the conventional Bull's eye negative film, a cross pattern with the intersection thereof located at the center of the image and a test pattern 80 including a resolving power chart with a plurality of bars arranged at regular intervals.

A scanner 58 including an image sensor or the like is arranged in the downstream of the light path passing through the half mirror 60. The scanner 58 is connected to negative density measuring unit 62 for measuring the density of an image of a negative film read by the scanner 58.

The main exposure section 18 includes a main controller 72 for monitoring and controlling the whole processing of the printer processor 10. This main controller 72 is comprised of a CPU, a RAM, a ROM and an input/output interface not illustrated. The main controller 72 is connected with the above-mentioned CC filter controller 70, the negative density measuring unit 62 and the image signal processing unit 46 for monitoring and controlling the operation of these component units.

The main controller 72 fetches the measured image density of each frame of the negative film from the negative density measuring unit 62, and calculates the amount of correction of the exposure conditions of each frame of the negative film N on the basis of the image density of each frame. The amount of correction of the exposure conditions thus calculated is transmitted to the CC filter controller 70. The CC filter controller 70 that has received the correction amount of the exposure conditions corrects the amount of insertion of each filter of the CC filter set 66 on the basis of the correction amount of the exposure conditions.

On the other hand, the subsidiary exposure section 16 includes a light-emitting diode (hereinafter referred to as the B-LED) 32 for emitting the blue color component of the light, a light-emitting diode (hereinafter referred to as an R-LED) 34 for emitting the red color component, and a light-emitting diode (hereinafter referred to as the G-LED) 36 for emitting the green color component, as an exposure light source for the index print. The operation of these diodes is controlled by a light source controller 38. The B-LED 32 is arranged on the exposure light axis X. Dichroic mirrors 28 are arranged in the downstream of the path of the light emitted from the B-LED 32, so that the red light emitted from the R-LED 34 and the green light emitted from the G-LED 36 have the optical axes thereof in registry with the exposure light axis X.

A mirror 27 is arranged at the end of the light path (the position having no effect on the image) downstream of the dichroic mirrors 28 along the direction in which the light proceeds. A source light amount sensor 26 for measuring the quantity of light emitted from the light source is arranged along the direction in which the light is reflected from the mirror 27.

A liquid crystal panel 22 is arranged in a plane perpendicular to the exposure light axis X downstream of the mirror 27. A multiplicity of pixels capable of displaying white, black and intermediate tones therebetween by electrical means are regularly arranged on the display surface of the liquid crystal panel 22. The liquid crystal panel 22 is capable of displaying 256 tones. The liquid crystal panel 22 is connected through a liquid crystal panel driver 24 for driving the liquid crystal panel 22 to a subsidiary controller 40 for monitoring and controlling the processing at the subsidiary exposure section 16. The subsidiary controller 40, like the main controller 72 described above, is configured of a CPU, a RAM, a ROM and an input/output interface not illustrated, and is connected to the image memory 42 described above through the input/output interface.

The subsidiary controller 40 reads out various test patterns prestored in the image memory 42, and is capable of displaying the test pattern read out on the liquid crystal panel 22. Also, the subsidiary controller 40 fetches the stored image data of each frame of a negative film N from the image memory 42, forms an index image data with a plurality of image frames arranged according to a predetermined rule, and causes the liquid crystal panel driver 24 to display on the liquid crystal panel 22 an image corresponding to image data of a predetermined number of frames, as an example, five frames (one line) of the index image data formed. It is also possible that the image corresponding to the image data only for the color components of R, G and B among a line of image data described above is displayed on the liquid crystal panel 22.

A mirror 23 is arranged at the end of the light path (at the position not affecting the image) in the downstream of the liquid crystal panel 22. A transmitted light quantity sensor 25 for measuring the light quantity that has passed through the liquid crystal panel 22 is arranged along the direction in which light is reflected from the mirror 23.

An exposure lens 20 for modifying the image magnification of the index print to be exposed is arranged downstream of the position of the mirror 23. The image of the index print displayed on the liquid crystal panel 22 by the exposure lens 20 and projected by the exposure light forms an image with a predetermined magnification on the color paper P.

Also, the subsidiary controller 40 is connected to the light-source controller 38, the source light quantity sensor 26 and the transmitted light quantity sensor 25. The subsidiary controller 40 calculates the proper correction amount of the light quantity on the basis of the light quantity value of each of the R, G and B colors measured by the source light quantity sensor 26, and causes the light-source controller 38 to correct the light quantity emitted from the B-LED 32, R-LED 34 and G-LED 36. In similar fashion, the subsidiary controller 40 controls the liquid crystal panel driver 24 and thereby adjusts the density of the image displayed on the liquid display panel 22 in such a manner as to attain a proper amount of transmitted light on the basis of the amount of the transmitted light quantity measured by the transmitted light quantity sensor 25. Also, the subsidiary controller 40 is connected to the main controller 72, so that the subsidiary exposure section 16 exchanges various control information and the like with the main controller 72.

A processor section 14 for performing various processings including development, fixing, washing in water and drying of the exposed color paper P is arranged downstream of the printer section 12 along the direction in which the color paper P is transported. The processor section 14 includes a color development bath for storing a color developing solution, a bleach-fix bath for storing a bleaching-fixing solution and a plurality of rinsing baths for storing a washing solution. As the color paper P is transported sequentially through the color development bath, the bleach-fix bath and the rinsing baths, the operations of development, fixing and washing are performed in that order. Next, the color paper P is dried by warm air or the like, after which it is cut by image frames into photographic prints.

Also, the processor section 14 includes a paper density measuring unit 74 for measuring the density of the color paper P after being dried. The paper density measuring unit 74 is connected with the main controller 72. More specifically, the main controller 72 is designed to fetch the density measurement of the color paper P from the paper density measuring unit 74.

Now, the operation of this embodiment will be described. An example is taken of the case in which the present invention is applied to setting the conditions for transporting the paper in the printer processor 10.

Figure 3:
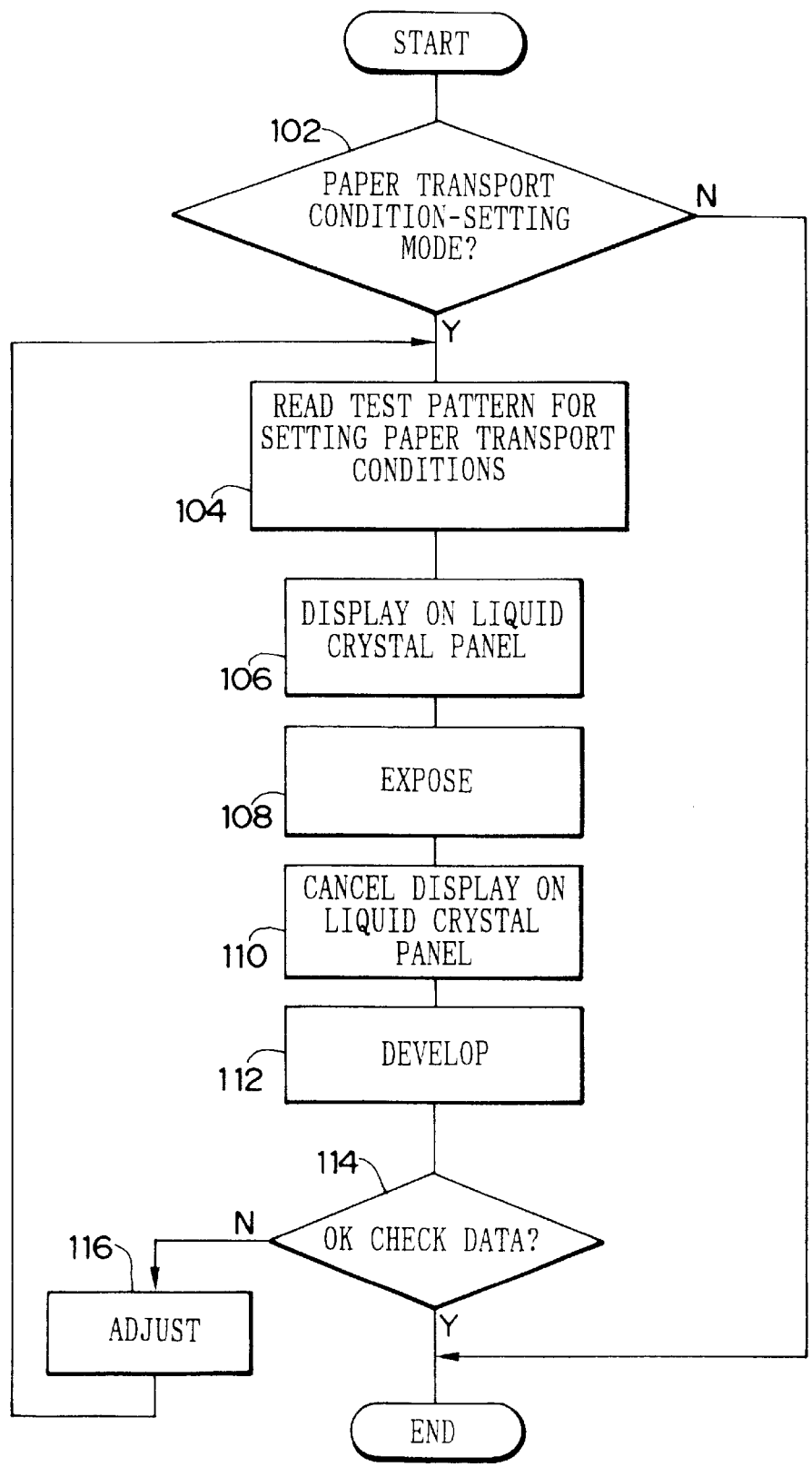
FIG. 3 is a flowchart showing a control routine of a subsidiary control section for setting paper-transport conditions.

When the operator gives an instruction for starting the condition-setting work, the subsidiary controller 40 starts executing the control routine shown in FIG. 3. In step 102 it is determined whether or not the conditions to be set according to the start instruction are the paper transport conditions (the paper transport condition-setting mode). Only in the case where the mode is for setting the paper transport conditions, the process is passed to step 104. In step 104 a test pattern for setting the paper transport conditions including a cross pattern with the intersection thereof located at the image center is read from the image memory 42, followed by step 106 where the test pattern thus read out is displayed on the liquid crystal panel 22.

Figure 2:
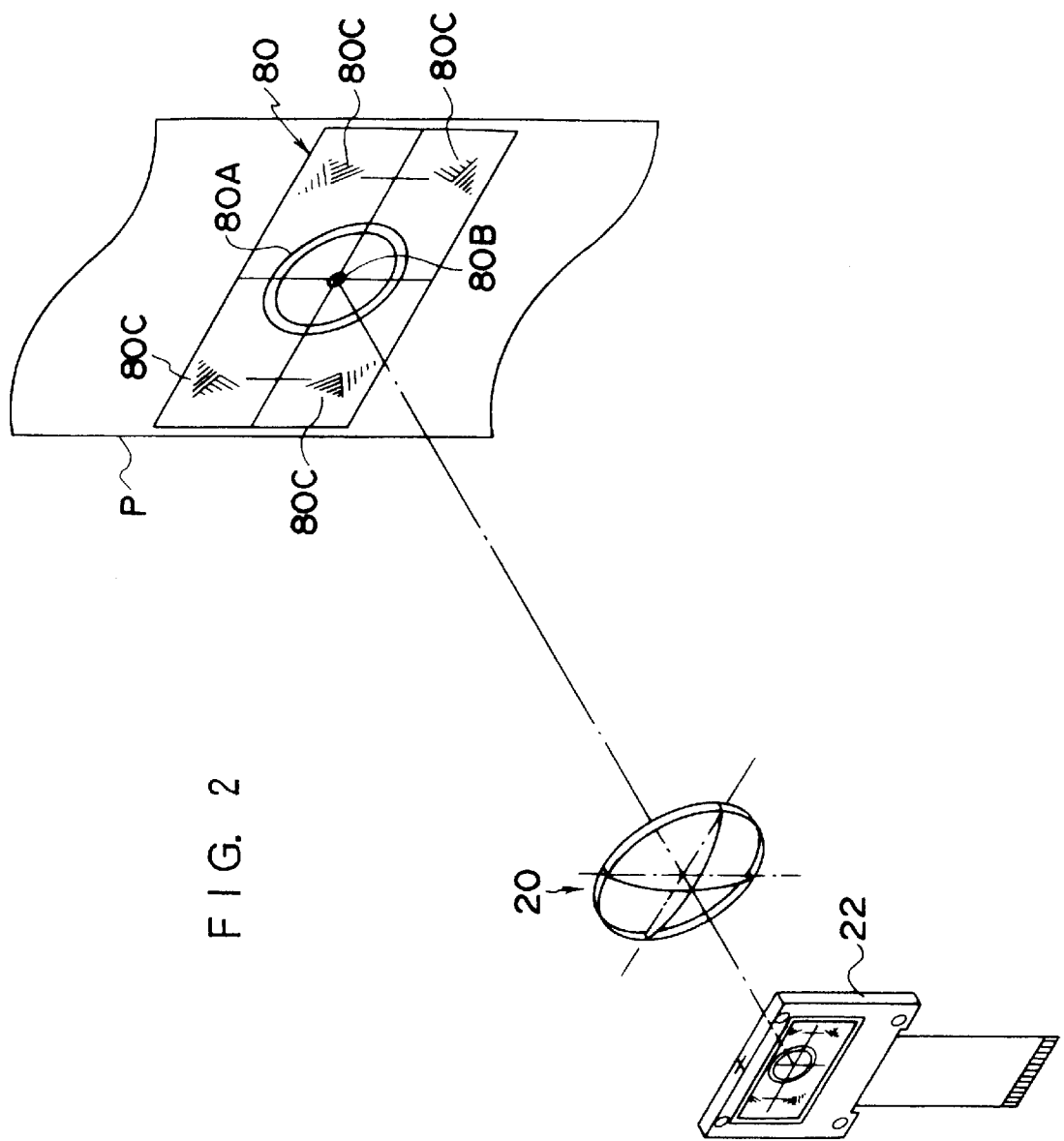
FIG. 2 is a diagram showing exposure of a test pattern displayed on a liquid crystal panel on color paper.

In the next step 108, as shown in FIG. 2, the test pattern displayed on the liquid crystal panel 22 is exposed on the color paper P. As a result, a test pattern image 80 is exposed on the color paper P. In the next step 110, the test pattern display on the liquid crystal display 22 is canceled, followed by step 112 where the color paper P thus exposed is transported to each of the processing baths in the processor section 14 for performing such predetermined processings as development, fixing, washing and drying. The color paper P, after being dried, has the density thereof measured at the paper density measuring section 74, followed by being cut. As a consequence, the test pattern image 80 is recorded and a print thereof is produced.

The operator measures the amount of displacement of the intersection 80B of the cross pattern from the central position of the print thus produced. In the case where the displacement is not more than a predetermined allowance, the operator considers the paper transport performance to be normal and inputs an OK check data. When the displacement amount assumes a value beyond the predetermined allowance, on the other hand, the operator considers the paper transport performance as abnormal requiring adjustment, and inputs an NG (no good) check data.

In step 114, the subsidiary controller 40 decides whether the OK check data is input by the operator. In the case where the OK check data has been input, a normal paper transport performance is indicated, and therefore the control routine is terminated.

In the case where the NG check data is input, by contrast, the subsidiary controller 40 decides that the answer is negative, followed by step 116 where the paper transport performance is adjusted in compliance with an instruction from the operator. After this adjustment, the process returns to step 104 where a predetermined test pattern is read from the image memory 42 and the post-adjustment check work is performed on the basis of the test pattern. In this way, the paper transport conditions can be set.

The exposure conditions can be set for the subsidiary exposure section 16 in a manner similar to the process of setting the paper transport conditions described above. In this case, the paper density measuring section 74 measures the density value of an image 80A corresponding to the Bull's eye negative film contained in the image 80. The resulting density measurement is compared with a reference density value, so that proper exposure conditions can be set for the subsidiary exposure section 16.

The operator may also visually check an image 80C of the resolving power chart for the print produced, and then check the optical system of the subsidiary exposure section 16 for any focusing irregularities. Then he may check the accuracy of the lens magnification on the basis of the irregularities of bar intervals in the chart, whereby the conditions for correcting the optical system of the subsidiary exposure section 16 can also be set.

As described above, according to this embodiment, a test pattern image data is prestored in the image memory 42. At the time of setting conditions, the image data of the desired pattern is read from the image memory 42, and a test pattern image based on the image data thus read is displayed on the liquid crystal panel 22. Further, using a print image produced by performing the exposure and other processing based on the test pattern image displayed on the liquid crystal panel 22, conditions can be set for other than the exposure system of the main exposure section 18 (the paper transport conditions, the exposure conditions for the subsidiary exposure section 16 and the conditions for correcting the optical system for the subsidiary exposure section 16). As a result, the conditions can be set without using a negative film recorded with a test pattern (such as a Bull's eye or a chart negative film), and therefore the condition-setting labor can be reduced.

Also, a test pattern write unit 90 may be connected to the main controller 72 as shown in FIG. 1 for reading a condition-setting test pattern data. The image data read written in the image memory 42 may be written in the test pattern write unit 90 and may be acquired as described above at the time of setting conditions. Further, the condition-setting test pattern data stored in a memory of a separate photographic printer or an information processing system may be acquired by being received through a network 94 such as a LAN or through a test pattern receiver 92 for reading a medium such as a floppy disk.

Further, the condition-setting work can be easily carried out without any negative film but using only the existing component devices of the subsidiary exposure section 16 without resorting to new component parts.

Although an embodiment is described above in which the present invention is applied to a printer processor having an index print production section (subsidiary exposure section), the invention may be applied with equal effect to a photographic print system comprising an index printer and a paper processor separate from each other or a photographic printer comprising an image memory, a two-dimensional display unit for displaying the image data stored in the image memory, and an exposure system adapted to expose the image displayed on the two-dimensional display unit.

Also, apart from the foregoing embodiments in which a two-dimensional display unit is a liquid crystal panel, any of the devices shown in Table 1 may be employed as a two-dimensional display unit applicable to the present invention. The display unit according to the invention is not confined to those shown in Table 1 but the invention is applicable to a similar two-dimensional display unit.

TABLE 1

|  | Mnemonic | Meaning |
| --- | --- | --- |
| Light-emitting type | CRT | cathode ray tube |
|  | PDP | plasma display |
|  | ELD | electroluminescent display |
|  | VFD | vacuum fluorescent display |
|  | LED | light emitting diode |
| Photo-detecting type | LCD | liquid crystal display |
|  | ECD | electrochemical display |
|  | EPID | electrophoretic image display |
|  | SPD | suspended particle display |
|  | TBD | twisting ball display |
|  | PLZT | transparent ceramics display |
|  | DMD | digital micromirror device |

What is claimed is:

1. A photographic printer having a plane exposure section for exposing an image recorded on a photographic film by plane exposure on a light-sensitive material and a digital print section for displaying an image prestored in memory on a two-dimensional display unit and for exposing said image prestored in memory on the light-sensitive material, said photographic printer comprising:

test pattern data for condition-setting, which is from a source other than said photographic film exposed by a plane exposure section and which is pre-stored in memory;

determining means for determining operating conditions to be set;

test pattern data acquisition means for acquiring desired test pattern data to be used for setting operating conditions determined by said determining means;

display control means for displaying a test pattern based on said desired test pattern data on said two-dimensional display unit; and operating conditions setting means for setting operating conditions of the digital print section on the basis of a print image of the test pattern formed on said light-sensitive material and acquired by exposing the light-sensitive material with the image of the test pattern displayed on said two-dimensional display unit.

2. A photographic printer according to claim 1, wherein said test pattern data acquisition means acquires said condition-setting test pattern data from said memory.

3. A photographic printer according to claim 1, wherein said test pattern data acquisition means includes a test pattern writing unit for reading condition-setting test pattern data and for prestoring in said memory as image data.

4. A photographic printer according to claim 1, wherein said test pattern data acquisition means includes a test pattern receiving unit for prestoring condition-setting test pattern data in said memory as image data by receiving the condition-setting test pattern data with data communication and/or by reading a medium having the condition-setting test pattern data stored therein.

5. A photographic printer according to claim 1, wherein said operating conditions are at least one of the sets of transport conditions for said light-sensitive material, exposure conditions for said digital print section and device operating conditions for said digital print section.

6. A photographic printer according to claim 1, wherein said condition-setting test pattern data include image data of at least one of a cross pattern and a resolving power chart.

7. A photographic printer according to claim 1, wherein said two-dimensional display unit is one of a light-emitting two-dimensional display unit and a photo-detecting two-dimensional display unit.

8. A photographic printer according to claim 1, wherein said two-dimensional display unit is a liquid crystal panel.

9. A photographic printer according to claim 8, wherein said operating conditions are at least one of the sets of transport conditions for said light-sensitive material, exposure conditions for said digital print section and device operating conditions for said digital print section.

10. A photographic printer according to claim 9, wherein said test pattern data acquisition means acquires said condition-setting test pattern data from said memory.

11. A condition-setting method for a photographic printer in which an image recorded on a photographic film is exposed by plane exposure on a light-sensitive material, and image data prestored in a memory on a two-dimensional display unit and exposed on the light-sensitive material, said method comprising the steps of:

determining operating conditions to be set using determining means;

acquiring desired test pattern data for condition-setting determined by said determining means, which is from a source other than said photographic film exposed by a plane exposure section and which is pre-stored in memory;

displaying a test pattern based on said desired test pattern data on said two-dimensional display unit; and setting operating conditions of the digital print section on the basis of a print image of the test pattern formed on said light-sensitive material and acquired by exposing the light-sensitive material with the image of the test pattern displayed on said two-dimensional display unit.

12. A method according to claim 11, wherein said condition-setting test pattern data are acquired from the image data prestored in said memory.

13. A method according to claim 11, wherein said condition-setting test pattern data are acquired from the image data prestored in said memory, said image data are aquired by reading a condition-setting test pattern at least one time and prestoring in said memory.

14. A method according to claim 11, wherein said condition-setting test pattern data are acquired from the image data prestored in said memory by receiving the condition-setting test pattern data with data communication and/or by reading a medium having stored therein the condition-setting test pattern data.

15. A method according to claim 11, wherein said operating conditions are at least one of the sets of transport conditions for said light-sensitive material, exposure conditions for said digital print section and device operating conditions for said digital print section.

16. A method according to claim 11, wherein said condition-setting test pattern data include image data of at least one of a cross pattern and a resolving power chart.

17. A method according to claim 11, wherein said two-dimensional display unit is one of a light-emitting two-dimensional display unit and a photo-detecting two-dimensional display unit.

18. A method according to claim 11, wherein said two-dimensional display unit is a liquid crystal panel.

19. A method according to claim 18, wherein said operating conditions are at least one of the sets of transport conditions for said light-sensitive material, exposure conditions for said digital print section and device operating conditions for said digital print section.

20. A method according to claim 19, wherein said condition-setting test pattern data are acquired from the image data prestored in said memory.

21. A photographic printer, comprising:

a film printer for exposing an image recorded on a photographic film by plane exposure on a light-sensitive material; and an index printer comprising a memory and a two-dimensional display, said memory storing digital image signals representing the image recorded on the photographic film, said two-dimensional display displaying an index image corresponding to the digital image signals stored in said memory and exposing the index image on the light-sensitive material, said memory further storing condition-setting test pattern data acquired from a source other than photographic film exposed by said film printer, said two-dimensional display further displaying a desired test pattern corresponding to the condition-setting test pattern data stored in said memory, said desired test pattern data determined by determining means which determine operation conditions to be set, and exposing the desired test pattern on the light-sensitive material; and operation condition setting means for setting operating conditions of the digital print section on the basis of a print image of the test pattern formed on said light-sensitive material and acquired by exposing the light-sensitive material with the test pattern displayed on said two-dimensional display.

22. A photographic printer according to claim 21, wherein said operating conditions are at least one of the sets of transport conditions for said light-sensitive material, exposure conditions for said index printer and device operating conditions for said index printer.

23. A photographic printer according to claim 21, wherein said condition-setting test pattern data include image data of at least one of: a cross pattern, a bull's eye and a resolving power chart.

24. A photographic printer having a plane exposure section for exposing an image recorded on a photographic film by plane exposure on a light-sensitive material and a digital print section for displaying an image prestored in memory on a two-dimensional display unit and for exposing said image prestored in memory on the light-sensitive material, said photographic printer comprising:

test pattern data for condition-setting, which is from a source other than photographic film exposed by a plane exposure section and which is pre-stored in the memory;

determining means for determining operating conditions to be set;

test pattern data acquisition means for acquiring desired test pattern data to be used for setting operating conditions determined by said determining means;

display control means for displaying a test pattern based on said desired test pattern data on said two-dimensional display unit; and operating conditions setting means for setting operating conditions of the digital print section on the basis of a print image of the test pattern formed on said light-sensitive material and acquired by exposing the light-sensitive material with the image of the test pattern displayed on said two-dimensional display unit;

wherein said operating conditions are at least one of the sets of transport conditions for said light-sensitive material, exposure conditions for said digital print section and device operating conditions for said digital print section.

* * * * *